US012676364B2

(12) United States Patent　　(10) Patent No.:　US 12,676,364 B2
Lee et al.　　　　　　　　　　　　(45) Date of Patent:　*Jul. 7, 2026

(54) RECHARGEABLE BATTERY

(71) Applicant: Samsung SDI Co., Ltd., Yongin-si (KR)

(72) Inventors: Jong-Ha Lee, Yongin-si (KR); Youmee Kim, Yongin-si (KR); Byoungmin Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,733

(22) Filed: Feb. 27, 2024

(65) Prior Publication Data

US 2024/0204306 A1　　Jun. 20, 2024

Related U.S. Application Data

(63) Continuation of application No. 17/595,130, filed as application No. PCT/KR2020/009943 on Jul. 28, 2020.

(30) Foreign Application Priority Data

Aug. 19, 2019　(KR) ........................ 10-2019-0101311

(51) Int. Cl.
H01M 50/109　(2021.01)
H01M 10/04　(2006.01)
(Continued)

(52) U.S. Cl.
CPC ..... H01M 50/109 (2021.01); H01M 10/0427 (2013.01); H01M 10/049 (2013.01);
(Continued)

(58) Field of Classification Search
CPC ........... H01M 50/109; H01M 10/0427; H01M 10/049; H01M 50/153; H01M 50/181;
(Continued)

(56) References Cited

U.S. PATENT DOCUMENTS 3,340,099 A　9/1967　Sherfey
3,966,498 A　6/1976　Wuthrich
(Continued)

FOREIGN PATENT DOCUMENTS

CN　　1292935 A　　4/2001
CN　　1758474 A　　4/2006
(Continued)

OTHER PUBLICATIONS

International Search Report for corresponding Application No. PCT/KR2020/009943 dated Nov. 24, 2020, 5pp.
(Continued)

*Primary Examiner* — Stewart A Fraser
(74) *Attorney, Agent, or Firm* — Womble Bond Dickinson (US) LLP

(57)　　　　ABSTRACT

One aspect of the present invention is to provide a rechargeable battery that increases capacity and facilitates connection of the lead tab to the electrode terminal by reducing the thickness at which the electrode terminal is installed. A rechargeable battery according to an embodiment of the present invention includes: an electrode assembly formed by disposing and winding a separator between a first electrode and a second electrode; a case facing one of wound ends of the electrode assembly and accommodating the electrode assembly; a cap plate facing the other of the wound ends, and closing and sealing an opening of the case; an electrode terminal installed in a terminal hole formed in the cap plate by interposing an insulating sealing material; a first lead tab connecting the first electrode to the electrode terminal; and
(Continued)

a second lead tab connecting the second electrode to the case.

17 Claims, 7 Drawing Sheets

(51) Int. Cl.
| | |
|---|---|
| *H01M 50/153* | (2021.01) |
| *H01M 50/181* | (2021.01) |
| *H01M 50/46* | (2021.01) |

(52) U.S. Cl.
CPC ....... *H01M 50/153* (2021.01); *H01M 50/181* (2021.01); *H01M 50/46* (2021.01)

(58) Field of Classification Search
CPC ............. H01M 50/46; H01M 10/0431; H01M 50/159; H01M 50/188; H01M 50/191; H01M 50/202; H01M 50/528; H01M 50/545; H01M 50/559; H01M 50/562
See application file for complete search history.

(56) References Cited

U.S. PATENT DOCUMENTS

| | | | |
|---|---|---|---|
| 4,299,339 A | 11/1981 | Giroux et al. | |
| 5,834,133 A | 11/1998 | Narukawa et al. | |
| 6,001,504 A | 12/1999 | Batson et al. | |
| 6,159,630 A | 12/2000 | Wyser | |
| 6,569,562 B1 | 5/2003 | Spillman et al. | |
| 7,341,802 B1 | 3/2008 | Ota et al. | |
| 7,563,118 B1 | 7/2009 | McCauley et al. | |
| 8,389,163 B2 | 3/2013 | Takezawa | |
| 8,586,232 B2 | 11/2013 | Brenner et al. | |
| 9,153,835 B2 | 10/2015 | Pytlik et al. | |
| 9,178,251 B2 | 11/2015 | Gaugler | |
| 9,231,281 B2 | 1/2016 | Pytlik et al. | |
| 9,496,581 B2 | 11/2016 | Pytlik et al. | |
| 9,614,247 B2 | 4/2017 | Ensling et al. | |
| 9,799,858 B2 | 10/2017 | Gaugler | |
| 9,799,913 B2 | 10/2017 | Pytlik et al. | |
| 11,522,257 B2 | 12/2022 | Ko et al. | |
| 12,362,442 B2 | 7/2025 | Woo et al. | |
| 2001/0012582 A1 | 8/2001 | Kim | |
| 2002/0004162 A1 | 1/2002 | Satoh et al. | |
| 2002/0081484 A1 | 6/2002 | Exnar | |
| 2002/0192545 A1 | 12/2002 | Ramaswami et al. | |
| 2003/0003356 A1 | 1/2003 | Tsukamoto et al. | |
| 2004/0023108 A1 | 2/2004 | Nakanishi et al. | |
| 2004/0091770 A1 | 5/2004 | Kim | |
| 2004/0146780 A1 | 7/2004 | Rubino et al. | |
| 2004/0221446 A1 | 11/2004 | Ohhara et al. | |
| 2005/0095502 A1 | 5/2005 | Sugimune et al. | |
| 2006/0024574 A1 | 2/2006 | Yim et al. | |
| 2006/0032667 A1 | 2/2006 | Sato | |
| 2006/0040177 A1 | 2/2006 | Onodera et al. | |
| 2006/0099504 A1 | 5/2006 | Kim | |
| 2007/0059592 A1 | 3/2007 | Takami et al. | |
| 2007/0117011 A1 | 5/2007 | Myerberg et al. | |
| 2008/0038629 A1 | 2/2008 | Okabe et al. | |
| 2008/0292962 A1 | 11/2008 | Jung | |
| 2009/0092897 A1 | 4/2009 | Lee | |
| 2009/0117459 A1 | 5/2009 | Hyung et al. | |
| 2010/0047666 A1 | 2/2010 | Tatsumi | |
| 2010/0239897 A1 | 9/2010 | Sumihara et al. | |
| 2010/0247984 A1 | 9/2010 | Yamashita et al. | |
| 2011/0064972 A1 | 3/2011 | Park et al. | |
| 2011/0081572 A1 | 4/2011 | Byun et al. | |
| 2011/0151294 A1 | 6/2011 | Kang et al. | |
| 2011/0200871 A1 | 8/2011 | Pytlik et al. | |
| 2011/0244308 A1 | 10/2011 | Byun et al. | |
| 2011/0287291 A1 | 11/2011 | Byun et al. | |
| 2011/0300414 A1* | 12/2011 | Baek ................... H01M 50/169 |
| | | | 429/7 |
| 2012/0015224 A1 | 1/2012 | Pytlik et al. | |
| 2012/0052373 A1 | 3/2012 | Kim | |
| 2012/0064393 A1 | 3/2012 | Schimmele et al. | |
| 2012/0129012 A1 | 5/2012 | Baek | |
| 2012/0315513 A1 | 12/2012 | Ro | |
| 2013/0196218 A1 | 8/2013 | Masuda | |
| 2013/0196219 A1 | 8/2013 | Kim | |
| 2013/0252078 A1 | 9/2013 | Km et al. | |
| 2013/0260212 A1 | 10/2013 | Kohno et al. | |
| 2013/0273411 A1 | 10/2013 | Kim | |
| 2014/0106210 A1 | 4/2014 | Deng et al. | |
| 2014/0220424 A1* | 8/2014 | Roh .................... H01M 50/566 |
| | | | 429/179 |
| 2014/0242426 A1 | 8/2014 | Kwak et al. | |
| 2014/0242439 A1 | 8/2014 | Hattori et al. | |
| 2014/0295232 A1 | 10/2014 | Kim et al. | |
| 2014/0363703 A1 | 12/2014 | Park et al. | |
| 2014/0377601 A1 | 12/2014 | Kim | |
| 2015/0072201 A1 | 3/2015 | Kubota et al. | |
| 2015/0236331 A1 | 8/2015 | Jang et al. | |
| 2015/0243940 A1 | 8/2015 | Kang | |
| 2015/0263376 A1* | 9/2015 | Kondo .............. H01M 10/4235 |
| | | | 429/94 |
| 2015/0295211 A1 | 10/2015 | Kim et al. | |
| 2016/0118641 A1 | 4/2016 | Oda et al. | |
| 2016/0126534 A1 | 5/2016 | Lee et al. | |
| 2016/0141591 A1 | 5/2016 | Lee | |
| 2016/0190607 A1 | 6/2016 | Wyser et al. | |
| 2016/0204411 A1 | 7/2016 | Lee et al. | |
| 2016/0268583 A1 | 9/2016 | Joswig et al. | |
| 2016/0276637 A1 | 9/2016 | Kusaba | |
| 2017/0012251 A1 | 1/2017 | Shrashi | |
| 2017/0018794 A1 | 1/2017 | Lee et al. | |
| 2017/0040575 A1 | 2/2017 | Bang | |
| 2017/0054130 A1 | 2/2017 | Roh et al. | |
| 2017/0117516 A1 | 4/2017 | Jung | |
| 2017/0149030 A1 | 5/2017 | Lee et al. | |
| 2017/0170450 A1 | 6/2017 | Guen | |
| 2017/0187008 A1 | 6/2017 | Gaugler | |
| 2017/0187025 A1 | 6/2017 | Watanabe et al. | |
| 2017/0194617 A1* | 7/2017 | Baik ................... H01M 50/567 |
| 2017/0207491 A1 | 7/2017 | Tamachi et al. | |
| 2017/0309879 A1 | 10/2017 | Ko et al. | |
| 2017/0309880 A1 | 10/2017 | Ko et al. | |
| 2017/0365874 A1 | 12/2017 | Pytlik et al. | |
| 2018/0013101 A1 | 1/2018 | Gaugler | |
| 2018/0040918 A1 | 2/2018 | Guen | |
| 2018/0062152 A1 | 3/2018 | Yoshida et al. | |
| 2018/0183018 A1* | 6/2018 | Maeda ................. H01M 50/55 |
| 2018/0277904 A1 | 9/2018 | Sasakawa et al. | |
| 2018/0358648 A1 | 12/2018 | Guen | |
| 2019/0058198 A1 | 2/2019 | Fan et al. | |
| 2019/0189998 A1 | 6/2019 | Muroya et al. | |
| 2019/0214625 A1 | 7/2019 | Lee et al. | |
| 2019/0319295 A1 | 10/2019 | Kim et al. | |
| 2020/0020896 A1 | 1/2020 | Lim et al. | |
| 2020/0358048 A1 | 11/2020 | Kim et al. | |
| 2020/0403210 A1 | 12/2020 | Tse et al. | |
| 2021/0057681 A1 | 2/2021 | Lee et al. | |
| 2021/0074987 A1 | 3/2021 | Kim | |
| 2021/0091435 A1 | 3/2021 | Muraki | |
| 2021/0249720 A1 | 8/2021 | Chen et al. | |
| 2021/0320386 A1 | 10/2021 | Lim et al. | |
| 2021/0328290 A1 | 10/2021 | Lee et al. | |
| 2021/0359362 A1 | 11/2021 | Wang et al. | |
| 2021/0384576 A1 | 12/2021 | Peng et al. | |
| 2021/0399373 A1 | 12/2021 | Ko et al. | |
| 2021/0408648 A1 | 12/2021 | Ko et al. | |
| 2021/0408650 A1 | 12/2021 | Guo et al. | |
| 2022/0021087 A1 | 1/2022 | Guo et al. | |
| 2022/0102789 A1 | 3/2022 | Shimizu et al. | |
| 2022/0200110 A1 | 6/2022 | Katsumoto et al. | |
| 2022/0216544 A1* | 7/2022 | Lee .................... H01M 50/528 |
| 2022/0223872 A1 | 7/2022 | Watanabe et al. | |
| 2022/0223984 A1* | 7/2022 | Lee .................... H01M 50/559 |
| 2022/0311108 A1 | 9/2022 | Eguchi et al. | |
| 2022/0384919 A1 | 12/2022 | Katsumoto et al. | |
| 2023/0048086 A1 | 2/2023 | Eguchi et al. | |

(56) References Cited

U.S. PATENT DOCUMENTS

| | | | |
|---|---|---|---|
| 2023/0057980 A1 | 2/2023 | Kitamura | |
| 2023/0070512 A1 | 3/2023 | Watanabe et al. | |
| 2024/0063517 A1 | 2/2024 | Hwangbo et al. | |

FOREIGN PATENT DOCUMENTS

| | | |
|---|---|---|
| CN | 1897348 A | 1/2007 |
| CN | 101694881 A | 4/2010 |
| CN | 101897059 A | 11/2010 |
| CN | 101926021 A | 12/2010 |
| CN | 102208592 A | 10/2011 |
| CN | 102255066 A | 11/2011 |
| CN | 102270752 A | 12/2011 |
| CN | 102318122 A | 1/2012 |
| CN | 102376930 A | 3/2012 |
| CN | 202749463 U | 2/2013 |
| CN | 103325986 A | 9/2013 |
| CN | 104103856 A | 10/2014 |
| CN | 203895519 U | 10/2014 |
| CN | 104485483 A | 4/2015 |
| CN | 204361193 U | 5/2015 |
| CN | 204558566 U | 8/2015 |
| CN | 204596910 U | 8/2015 |
| CN | 104882572 A | 9/2015 |
| CN | 105552295 A | 5/2016 |
| CN | 105609862 A | 5/2016 |
| CN | 105789674 A | 7/2016 |
| CN | 205467668 U | 8/2016 |
| CN | 105990540 A | 10/2016 |
| CN | 106159350 A | 11/2016 |
| CN | 106356490 A | 1/2017 |
| CN | 106469803 A | 3/2017 |
| CN | 106803553 A | 6/2017 |
| CN | 107359290 A | 11/2017 |
| CN | 107768586 A | 3/2018 |
| CN | 207233788 U | 4/2018 |
| CN | 207282605 U | 4/2018 |
| CN | 108987790 A | 12/2018 |
| CN | 109148936 A | 1/2019 |
| CN | 109192889 A | 1/2019 |
| CN | 106159350 B | 4/2019 |
| CN | 109643772 A | 4/2019 |
| CN | 208862041 U | 5/2019 |
| CN | 109980149 A | 7/2019 |
| CN | 209104289 U | 7/2019 |
| CN | 209401665 U | 9/2019 |
| CN | 209401723 U | 9/2019 |
| CN | 111082156 A | 4/2020 |
| CN | 210245625 U | 4/2020 |
| CN | 210379128 U | 4/2020 |
| CN | 111108631 A | 5/2020 |
| CN | 210897346 U | 6/2020 |
| CN | 111933831 A | 11/2020 |
| CN | 113823876 A | 12/2021 |
| DE | 26 10 414 A1 | 9/1976 |
| DE | 102018200159 A1 | 7/2019 |
| EP | 1217670 A1 | 6/2002 |
| EP | 0 935 288 B1 | 5/2007 |
| EP | 3 680 956 A1 | 7/2020 |
| EP | 3 783 713 A1 | 2/2021 |
| EP | 3 800 685 A1 | 4/2021 |
| EP | 3 930 087 A1 | 12/2021 |
| EP | 3926743 A1 | 12/2021 |
| GB | 1 544 711 A | 4/1979 |
| JP | S62-133664 A | 6/1987 |
| JP | 3020967 U | 2/1996 |
| JP | 3022651 U | 3/1996 |
| JP | 2001-102015 A | 4/2001 |
| JP | 2001-307715 A | 11/2001 |
| JP | 2003-346773 A | 12/2003 |
| JP | 2004-228086 A | 8/2004 |
| JP | 2004-335265 A | 11/2004 |
| JP | 2005-56648 A | 3/2005 |
| JP | 2007-027020 A | 2/2007 |
| JP | 2008-262827 A | 10/2008 |
| JP | 2008-305803 A | 12/2008 |
| JP | 2009-76385 A | 4/2009 |
| JP | 2009-076394 A | 4/2009 |
| JP | 5147365 B2 | 2/2013 |
| JP | 2013-137992 A | 7/2013 |
| JP | 2013-161584 A | 8/2013 |
| JP | 2015-5492 A | 1/2015 |
| JP | 5670270 B2 | 2/2015 |
| JP | 2016-122619 A | 7/2016 |
| JP | 2016-134333 A | 7/2016 |
| JP | 2016-173976 A | 9/2016 |
| JP | 2016-207433 A | 12/2016 |
| JP | 2017-130435 A | 7/2017 |
| JP | 6342231 B2 | 6/2018 |
| KR | 10-2001-0105524 A | 11/2001 |
| KR | 10-0357957 B1 | 10/2002 |
| KR | 10-2004-0034248 A | 4/2004 |
| KR | 10-2005-0121511 A | 12/2005 |
| KR | 10-0611619 B1 | 8/2006 |
| KR | 10-0686837 B1 | 2/2007 |
| KR | 10-0731414 B1 | 6/2007 |
| KR | 10-2007-0069859 A | 7/2007 |
| KR | 10-0760754 B1 | 9/2007 |
| KR | 10-2008-0087345 A | 10/2008 |
| KR | 10-2008-0092842 A | 10/2008 |
| KR | 10-2009-0030711 A | 3/2009 |
| KR | 10-2009-0035226 A | 4/2009 |
| KR | 10-0947989 B1 | 3/2010 |
| KR | 10-2011-0072811 A | 6/2011 |
| KR | 10-1087046 B1 | 11/2011 |
| KR | 10-2011-0134259 A | 12/2011 |
| KR | 10-2012-0036970 A | 4/2012 |
| KR | 10-2014-0081105 A | 7/2014 |
| KR | 10-2015-0098418 A | 8/2015 |
| KR | 10-2016-0009914 A | 1/2016 |
| KR | 10-2016-0031640 A | 3/2016 |
| KR | 10-2016-0043725 A | 4/2016 |
| KR | 10-2016-0053735 A | 5/2016 |
| KR | 10-2017-0012736 A | 2/2017 |
| KR | 10-2017-0017514 A | 2/2017 |
| KR | 10-2017-0120979 A | 11/2017 |
| KR | 10-2018-0025734 A | 3/2018 |
| KR | 10-2018-0027874 A | 3/2018 |
| KR | 10-2018-0054278 A | 5/2018 |
| KR | 10-2019-0101589 A | 9/2019 |
| KR | 10-2019-0136202 A | 12/2019 |
| KR | 10-2020-0007562 A | 1/2020 |
| KR | 10-2020-0020173 A | 2/2020 |
| KR | 10-2020-0020619 A | 2/2020 |
| WO | WO 99/46825 A1 | 9/1999 |
| WO | WO 2012/121468 A1 | 9/2012 |
| WO | WO 2018/016766 A1 | 1/2018 |
| WO | WO 2020/004412 A1 | 1/2020 |
| WO | WO 2020-009206 A1 | 1/2020 |
| WO | WO 2020/036440 A1 | 2/2020 |
| WO | WO 2020/138492 A1 | 7/2020 |
| WO | WO 2021/085807 A1 | 5/2021 |
| WO | WO 2021/182835 A1 | 9/2021 |

OTHER PUBLICATIONS

EPO Extended European Search Report dated Apr. 14, 2022 issued in corresponding EP Application No. 21209286.0, 9 pages.

EPO Extended European Search Report dated Dec. 13, 2021 issued in Application No. 21179916.8, 7 pages.

EPO Extended European Search Report dated May 9, 2022 issued in corresponding European Patent Application No. 21208991.6, 6 pages.

EPO Extended European Search Report issued in patent application No. EP 22151348.4. dated Jun. 10, 2022, 10 pages.

EPO Extended European Search Report issued Nov. 22, 2021 in corresponding EP Application No. 21179539.8, 9 pages.

International Search Report & Written Opinion for corresponding Application No. PCT/KR2020/017371, dated Mar. 8, 2021, with English, 9 pages.

International Search Report & Written Opinion for corresponding Application No. PCT/KR2021/008621, dated Oct. 14, 2021, 6 pages.

(56)        References Cited

OTHER PUBLICATIONS

U.S. Office Action from U.S. Appl. No. 17/178,553, dated Aug. 19, 2022, 19 pages.
U.S. Office Action from U.S. Appl. No. 17/189,727, dated Jun. 22, 2022, 17 pages.
US Final Office Action dated Dec. 15, 2022, issued in U.S. Appl. No. 17/178,553 (13 pages).
US Final Office Action dated Jan. 3, 2023, issued in U.S. Appl. No. 17/189,727 (19 pages).
US Office Action dated Jan. 5, 2023, issued in U.S. Appl. No. 17/646,037 (14 pages).
US Office Action dated Feb. 1, 2023, issued in U.S. Appl. No. 17/531,185 (17 pages).
Wu machine translation (Year: 2020), cited in the US Office Action dated Feb. 1, 2023 issued in U.S. Appl. No. 17/531,185.
Hwang machine translation (Year: 2012), cited in the US Office Action dated Feb. 1, 2023 issued in U.S. Appl. No. 17/531,185.
Lee machine translation (Year: 2008), cited in the US Office Action dated Feb. 1, 2023 issued in U.S. Appl. No. 17/531,185.
Sumihara translation (Year: 2009), cited in the US Office Action dated Feb. 1, 2023 issued in U.S. Appl. No. 17/531,185.
Kusaba machine translation (Year: 2016), cited in the US Office Action dated Feb. 1, 2023 issued in U.S. Appl. No. 17/531,185.
Lazada (https://www.lazada.eom.ph/products/jiasheng-glass-fiber-cloth-aluminum-foil-tape-heat-insulation-tube-sunscreen-water-heater-range-hood-flame-retardant-and-high-temperature-resistant-glass-fiber-aluminum-foil-adhesive-tape-width-50-80-100mm-i3356154067) (Year: 2023); cited in the US Office Action dated Feb. 1, 2023 issued in U.S. Appl. No. 17/531,185.
US Advisory Action dated Feb. 23, 2023, issued in U.S. Appl. No. 17/178,553 (2 pages).
Chinese Office Action, with English translation, dated Feb. 10, 2023, issued in corresponding Chinese Patent Application No. 202080041293.1 (18 pages).
US Advisory Action dated Mar. 20, 2023, issued in U.S. Appl. No. 17/189,727 (3 pages).
US Office Action dated Mar. 30, 2023, issued in U.S. Appl. No. 17/178,553 (13 pages).
US Final Office Action dated May 1, 2023, issued in U.S. Appl. No. 17/646,037 (13 pages).
US Advisory Action dated Jul. 13, 2023, issued in U.S. Appl. No. 17/646,037 (3 pages).
Chinese Office Action, with English translation, dated Jul. 6, 2023, issued in Chinese Patent Application No. 202080041293.1 (14 pages).
EPO Office Action dated Jul. 21, 2023, issued in European Patent Application No. 21208991.6 (3 pages).
EP-1217670-A1 (text) (Year: 2002).
US Final Office Action dated Aug. 16, 2023, issued in U.S. Appl. No. 17/531,185 (18 pages).
US Office Action dated Sep. 22, 2023, issued in U.S. Appl. No. 17/646,037 (15 pages).
US Final Office Action dated Oct. 12, 2023, issued in U.S. Appl. No. 17/178,553 (11 pages).
US Office Action dated Oct. 25, 2023, issued in U.S. Appl. No. 17/189,727 (21 pages).
EPO Extended European Search Report dated Nov. 8, 2023, issued in European Patent Application No. 20853680.5 (7 pages).
Chinese Notice of Allowance, with English translation, dated Oct. 23, 2023, issued in Chinese Patent Application No. 202080041293.1 (8 pages).
Chinese Office Action, with English translation, dated Nov. 20, 2023, issued in Chinese Patent Application No. 202110665013.0 (16 pages).
Chinese Office Action, with English translation, dated Dec. 14, 2023, issued in Chinese Patent Application No. 202111367483.5 (18 pages).
Chinese Office Action, with English translation, dated Dec. 14, 2023, issued in Chinese Patent Application No. 202180007469.6 (15 pages).

US Advisory Action dated Nov. 16, 2023, issued in U.S. Appl. No. 17/531,185 (5 pages).
Chinese Office Action for CN Application No. 202110623103.3 dated Dec. 29, 2023, with English translation, 11 pages.
Chinese Office Action for CN Application No. 202111361397.3 dated Dec. 26, 2023, with English translation, 14 pages.
KR-20160031640-A (translation) (Year: 2016).
International Search Report for Application No. PCT/KR2020/009946 dated Nov. 13, 2020, 5 pages.
US Final Office Action dated Jan. 18, 2024, issued in U.S. Appl. No. 17/646,037 (13 pages).
US Office Action dated Feb. 12, 2024, issued in U.S. Appl. No. 17/595,130 (13 pages).
US Office Action dated Feb. 23, 2024, issued in U.S. Appl. No. 17/531,185 (15 pages).
US Office Action dated Feb. 23, 2024, issued in U.S. Appl. No. 17/595,123 (17 pages).
Chinese Office Action with English translation, dated Feb. 29, 2024, issued in Chinese Patent Application No. 202080062909.3 (13 pages).
US Office Action dated Apr. 10, 2024, issued in U.S. Appl. No. 17/178,553 (14 pages).
Jp S62133664 A (machine translation) (Year: 1987).
EPO Extended European Search Report dated May 23, 2024, issued in European Patent Application No. 21837428.8 (9 pages).
US Final Office Action dated May 23, 2024, issued in U.S. Appl. No. 17/531,185 (17 pages).
EPO Office Action dated Jul. 5, 2024, issued in European Patent Application No. 21179539.8 (5 pages).
US Office Action dated Oct. 1, 2024, issued in U.S. Appl. No. 17/529,165 (10 pages).
Aress High Duty Forgings (2018). "5 Reasons Why Aluminium Forging is Better Than Aluminum Casting." https://www.indiaforging.com/blog/5-reasons-why-aluminium-forging-is-better-than-aluminium-casting. php (Year: 2018), pages.
EPO Extended European Search Report dated Dec. 20, 2024, issued in European Patent Application No. 20932441.7 (10 pages).
US Final Office Action dated Nov. 6, 2024, issued in U.S. Appl. No. 17/178,553 (23 pages).
US Office Action dated Nov. 13, 2024, issued in U.S. Appl. No. 17/870,763 (15 pages).
US Office Action dated Nov. 20, 2024, issued in U.S. Appl. No. 17/870,755 (13 pages).
US Office Action dated Dec. 2, 2024, issued in U.S. Appl. No. 17/646,037 (19 pages).
US Office Action dated Dec. 19, 2024, issued in U.S. Appl. No. 17/596,814 (23 pages).
European Office Action dated Sep. 25, 2024, issued in European Patent Application No. 21209286.0 (5 pages).
Korean Office Action dated Feb. 6, 2025, issued in Korean Patent Application No. 10- 2019-0101311 (8 pages).
US Office Action dated Feb. 12, 2025, issued in U.S. Appl. No. 17/595,130 (11 pages).
US Final Office Action dated May 19, 2025, issued in U.S. Appl. No. 17/646,037, 19 pages.
Chinese Office Action corresponding to CN Application No. 202210015719.7, dated Feb. 27, 2025, 9 pages.
US Final Office Action dated Mar. 17, 2025, issued in U.S. Appl. No. 17/870,763 (14 pages).
Duracell battery products: 2450 Lithium Coin Button Battery. Duracell Batteries I AA, AAA, Rechargeable, Coin Button. (Mar. 2, 2016). https://www.duracell.com/en-us/producU2450-lithium-coin-button-battery/#equivalent (Year: 2016).
US Office Action dated Jan. 30, 2025, issued in U.S. Appl. No. 17/794,242 (25 pages).
Korean Office Action dated Feb. 6, 2025, issued in Korean Patent Application No. 10-2019-0101312 (9 pages).
US Office Action dated Feb. 14, 2025, issued in U.S. Appl. No. 17/178,553 (25 pages).
US Final Office Action dated Jun. 4, 2025, issued in U.S. Appl. No. 17/870,755 (14 pages).
Korean Office Action corresponding to KR Application No. 10-2020-0087620, dated Jul. 3, 2025, 8 pages.

(56) References Cited

OTHER PUBLICATIONS

US Final Office Action dated Apr. 9, 2025, issued in U.S. Appl. No. 17/596,814 (15 pages).

US Office Action dated May 1, 2025, issued in U.S. Appl. No. 17/529,165 (9 pages).

US Final Office Action dated Jul. 30, 2025, issued in U.S. Appl. No. 17/794,242 (29 pages).

US Final Office Action dated Aug. 27, 2025, issued in U.S. Appl. No. 17/529,165 (11 pages).

US Office Action dated Sep. 8, 2025, issued in U.S. Appl. No. 17/189,727 (15 pages).

Chinese Office Action, with English translation, dated Dec. 29, 2023, issued in corresponding Chinese Patent Application No. 202180007352.8 (11 pages).

Chinese Office Action, with English translation, dated Dec. 29, 2023, issued in corresponding Chinese Patent Application No. 202210066056.1 (14 pages).

Chinese Office Action, with English translation, dated Dec. 30, 2023, issued in corresponding Chinese Patent Application No. 202180006612.X (13 pages).

Chinese Office Action dated Feb. 27, 2024 issued in corresponding Chinese Patent Application No. 202110320120.X (21 pages, including 13 pages of English translation).

Chinese Office Action dated Jun. 22, 2024, issued in corresponding Chinese Patent Application No. 202180006612.X (5 pages).

Chinese Office Action dated Jul. 4, 2024, issued in corresponding Chinese Patent Application No. 202210066056.1 (7 pages).

Chinese Office Action dated Nov. 29, 2024, issued in Chinese Patent Application No. 202180006612.X, 4 pages.

Extended European Search Report for corresponding European Patent Application No. 21165319.1, European Search Report mailed Aug. 26, 2021 (6 pages).

European Search Report for corresponding European Patent Application No. 21165303.5, European Search Report mailed Aug. 26, 2021 (7 pages).

Extended European Search Report issued in corresponding EP Application No. 22153106.4, dated Aug. 4, 2022 (7 pages).

European Office Action dated Aug. 28, 2023 issued in corresponding European Patent Application No. 21 165 303.5 (6 pages).

Extended European Search Report dated Sep. 23, 2024, issued in corresponding European Patent Application No. 21826174.1, 8 pages.

Extended European Search Report dated Dec. 16, 2024, issued in corresponding European Patent Application No. 21829363.7, 9 pages.

International Search Report issued in corresponding PCT Application No. PCT/KR2021/000134, dated Apr. 14, 2021 (4 pages).

International Search Report issued in corresponding PCT Application No. PCT/KR2021/002865, dated Jun. 21, 2021 (4 pages).

Korean Office Action dated Jun. 12, 2025, issued in corresponding KR Patent Application No. 10-2020-0074397 (7 pages).

Korean Office Action dated Jun. 18, 2025, issued in corresponding Korean Patent Application No. 10-2020-0076595 (7 pages).

Korean Office Action dated Jun. 20, 2025, issued in corresponding KR Patent Application No. 10-2020-0078575 (6 pages).

Korean Office Action dated Jul. 11, 2025, issued in corresponding Korean Patent Application No. 10-2021-0022787 (7 pages).

Korean Office Action corresponding to KR Application No. 10-2020-0160188, dated Oct. 10, 2025 (6 pages).

Korean Office Action corresponding to KR Application No. 10-2020-0154872, dated Oct. 21, 2025 (5 pages).

US Office Action dated Jan. 4, 2022, issued in U.S. Appl. No. 17/139,256 (15 pages).

US Office Action dated Feb. 18, 2022, issued in U.S. Appl. No. 17/139,261 (22 pages).

US Final Office Action dated Jul. 7, 2022, issued in U.S. Appl. No. 17/139,256 (16 pages).

US Office Action dated Apr. 26, 2023, issued in U.S. Appl. No. 17/139,256 (14 pages).

US Final Office Action dated Oct. 3, 2023, issued in U.S. Appl. No. 17/139,256 (14 pages).

US Office Action dated Oct. 1, 2024, issued in U.S. Appl. No. 17/592,291 (11 pages).

US Office Action dated Dec. 9, 2024, issued in U.S. Appl. No. 18/651,500 (18 pages).

US Office Action dated Apr. 9, 2025, issued in U.S. Appl. No. 17/592,291 (10 pages).

US Final Office Action dated Jun. 4, 2025, issued in U.S. Appl. No. 18/651,500 (15 pages).

US Office Action dated Oct. 2, 2025, issued in U.S. Appl. No. 18/000,819 (16 pages).

US Office Action dated Oct. 2, 2025, issued in U.S. Appl. No. 18/000,272 (20 pages).

US Office Action dated Oct. 27, 2025, issued in U.S. Appl. No. 17/646,037 (23 pages).

US Office Action dated Nov. 5, 2025, issued in U.S. Appl. No. 17/596,814 (19 pages).

US Office Action dated Nov. 5, 2025, issued in U.S. Appl. No. 17/870,755 (15 pages).

US Office Action dated Nov. 12, 2025, issued in U.S. Appl. No. 17/870,763 (30 pages).

US Office Action dated Nov. 17, 2025, issued in U.S. Appl. No. 17/794,242 (33 pages).

VMT "Copper vs Aluminum: A Materials Comparison Guide." https://vmtcnc.com/copper-vs-aluminum/ (Year: 2025) 9 pages.

Korean Office Action corresponding to KR Application No. 10-2021-0007544, dated Jan. 8, 2026, with English Translation (17 pages).

US Final Office Action dated Mar. 6, 2026, issued in U.S. Appl. No. 17/646,037 (22 pages).

US Final Office Action dated Apr. 16, 2026, issued in U.S. Appl. No. 18/000,819 (16 pages).

US Final Office Action dated Apr. 21, 2026, issued in U.S. Appl. No. 17/189,727 (18 pages).

Korean Notice of Allowance corresponding to KR Application No. 10-2019-0101311, dated Apr. 24, 2026 (2 pages).

US Final Office Action dated Apr. 28, 2026, issued in U.S. Appl. No. 18/000,272 (15 pages).

* cited by examiner

RECHARGEABLE BATTERY

CROSS-REFERENCE TO RELATED APPLICATIONS

This application is a continuation of U.S. patent application Ser. No. 17/595,130 filed Nov. 9, 2021, which is a U.S. National Phase Patent Application of International Application Number PCT/KR2020/009943, filed on Jul. 28, 2020, which claims priority to Korean Patent Application Number 10-2019-0101311, filed on Aug. 19, 2019, the entire content of both of which is incorporated herein by reference.

TECHNICAL FIELD

The present invention relates to a rechargeable battery. More particularly, the present invention relates to a small rechargeable battery.

BACKGROUND ART

Unlike a primary battery that is incapable of being recharged, a rechargeable battery can be repeatedly charged and discharged. A low capacity rechargeable battery has been used for small electronic devices such as a mobile phone, a laptop computer, and a camcorder, and a large capacity battery has been widely used as a power source for driving a motor of a hybrid vehicle.

A representative rechargeable battery includes a nickel-cadmium (Ni—Cd) battery, a nickel-hydrogen (Ni—MH) battery, a lithium (Li) battery, and a lithium ion (Li—ion) rechargeable battery. Particularly, the lithium ion secondary battery has a higher operation voltage than the nickel-cadmium battery or the nickel-hydrogen battery that is mainly used as a portable electric equipment power source by about three times. Also, the lithium ion secondary battery is widely used in an aspect that energy density per unit weight is high.

In particular, as a demand for wearable devices such as headphones, earphones, smartwatches, and body-mounted medical devices which use Bluetooth has increased, the need for rechargeable batteries of which energy density is high and is ultra-small has been increasing.

As an example, the ultra-small rechargeable battery includes a coin cell or a button cell. In the case of the coin cell or the button cell button cell, since the entire height is low, if the thickness of the part where the electrode terminal is installed increases, the battery capacity may be reduced. Also, since the end of the bent lead tab is adjacent to both ends of the wound electrode assembly whose height is low compared to the diameter, the workability for welding the end of the lead tab and the electrode terminal may deteriorate.

The above information disclosed in this Background section is only for enhancement of understanding of the background of the invention, and therefore it may contain information that does not form the prior art that is already known in this country to a person of ordinary skill in the art.

Disclosure

One aspect of the present invention is to provide a rechargeable battery that has increased capacity by reducing the thickness where the electrode terminal is installed, and facilitates the connection of the lead tab to the electrode terminal.

A rechargeable battery according to an embodiment of the present invention includes: an electrode assembly formed by disposing and winding a separator between a first electrode and a second electrode; a case facing one of wound ends of the electrode assembly and accommodating the electrode assembly; a cap plate facing the other of the wound ends, and closing and sealing an opening of the case; an electrode terminal installed in a terminal hole formed in the cap plate by interposing an insulating sealing material; a first lead tab connecting the first electrode to the electrode terminal; and a second lead tab connecting the second electrode to the case.

The insulating sealing material may be formed by a glass seal.

The electrode terminal may be formed as a plate with the same thickness as that of the cap plate.

The first lead tab may be connected to the electrode terminal, and the second lead tab may be connected to the case.

The electrode terminal may include a plate part of a second thickness t2 that is thinner than a first thickness t1 of the cap plate, and a both-sided flange part protruded from the exterior circumference of the plate part to both sides in the thickness direction and connected to the inner surface of the terminal hole with an insulating sealing material with a first height h1.

The both-sided flange part may be formed with the same first height (h1=t1) as the first thickness of the cap plate.

The first lead tab may be connected to the plate part by welding, and the second lead tab may be connected to the case by welding.

The electrode terminal may include a plate part of a third thickness t3 that is thinner than the first thickness t1 of the cap plate, and a one-sided flange part protruded from the exterior circumference of the plate part to one side in the thickness direction and connected to the inner surface of the terminal hole with an insulating sealing material with a second height h2.

The one-sided flange part may be formed with a second height (h2>t1) that is larger than the first thickness t1 of the cap plate.

The one-sided flange part may be disposed to be centered in the thickness direction in the terminal hole, and the insulating sealing material may be formed in a symmetrical structure on the inside and outside along the thickness direction.

The one-sided flange part may be disposed to be centered in the thickness direction in the terminal hole, the terminal hole may have a protrusion protruding from the center of the thickness direction toward the center of the diameter direction, and the insulating sealing material may form a symmetrical structure on the inside and outside along the thickness direction while filling the protrusion.

The one-sided flange part may be disposed to be biased to the inner surface side rather than the outer surface of the cap plate at the terminal hole, the plate part may be disposed by forming a horizontal plane with the outer surface of the cap plate in the terminal hole, and the insulating sealing material may form a horizontal plane with the outer surface of the cap plate and the outer surface of the plate part, and form a structure that is biased inward along the thickness direction.

The rechargeable battery according to an embodiment of the present invention may further include a first insulating member interposed between the second lead tab and the electrode assembly at the bottom side of the case.

The rechargeable battery according to an embodiment of the present invention may further include a second insulating member interposed between the first lead tab and the electrode assembly at the cap plate side.

The rechargeable battery according to an embodiment of the present invention may further include a third insulating member interposed between the first lead tab and the cap plate.

A height H may be set as the minimum distance between the outer planes of the case and the cap plate, a diameter D may be set as the maximum distance of the case exterior circumference, and the ratio of the height to the diameter may be 1 or less (H/D≤1).

The cap plate and the electrode terminal may be formed of stainless steel.

As such, the embodiment of the present invention installs the electrode terminal by interposing the insulating sealing material in the terminal hole formed in the cap plate, and connects the electrode terminal to the electrode assembly with the first lead tab, so the thickness at which the electrode terminal is installed is reduced, thereby increasing the capacity. In addition, an embodiment of the present invention may facilitate the connection of the first lead tab and the electrode terminal because the first lead tab is laser welded to the thin electrode terminal of the thin thickness.

DESCRIPTION OF THE DRAWINGS

FIG. 4 is an exploded perspective view of a rechargeable battery according to a third embodiment of the present invention.

MODE FOR INVENTION

Figure 1:
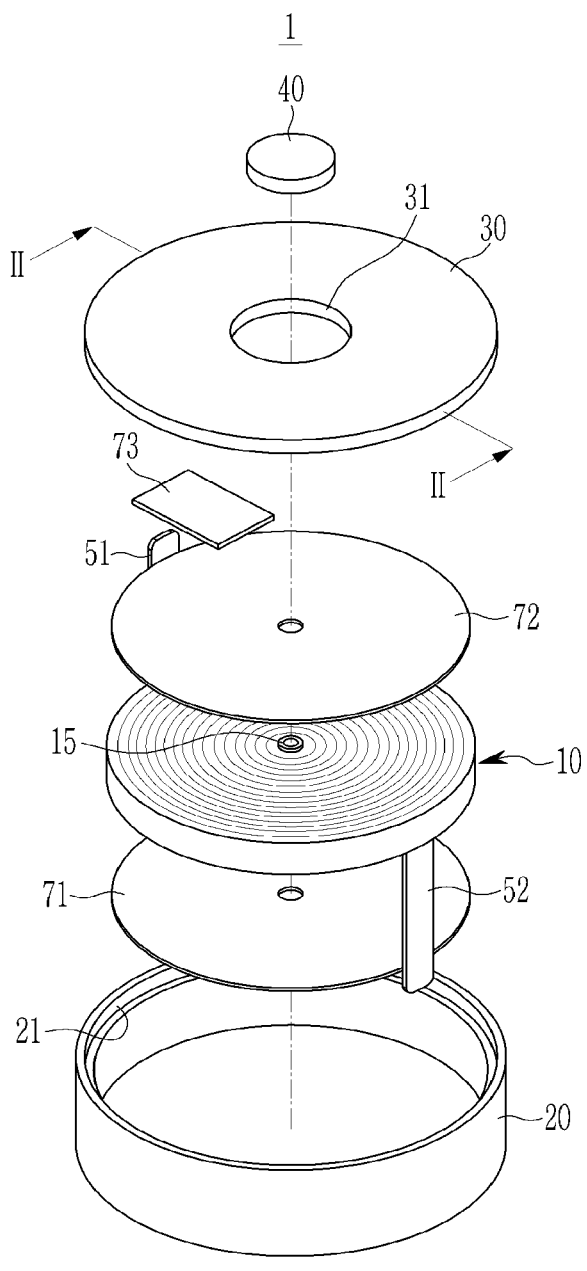
FIG. 1 is an exploded perspective view of a rechargeable battery according to a first embodiment of the present invention.

The present invention will be described more fully hereinafter with reference to the accompanying drawings, in which embodiments of the invention are shown. As those skilled in the art would realize, the described embodiments may be modified in various different ways, all without departing from the scope of the present invention. The drawings and description are to be regarded as illustrative in nature and not restrictive. Like reference numerals designate like elements throughout the specification.

A rechargeable battery according to an embodiment of the present invention is an ultra-small battery, and may be a coin cell or a button cell. Here, the coin cell or the button cell is a thin coin-type or button-type cell, and means a battery having a ratio (H/D) of a height (H) to a diameter (D) of 1 or less.

Since the coin cell or the button cell is mainly cylindrical, a horizontal cross-section is circular, but the present invention is not limited thereto, and a horizontal cross-section may be oval or polygonal. In this case, the diameter means the maximum distance based on the horizontal direction of the battery, and the height means the minimum distance from the flat bottom surface of the battery to the upper cross-section of the flat top of the battery.

However, the present invention is not limited to the coin cell or the button cell that is an example of the present invention, and a battery of the present invention may be a cylindrical-type or pin-type battery. Hereinafter, a case in which a rechargeable battery according to an embodiment of the present invention is a coin cell or a button cell will be described in detail as an example.

Figure 2:
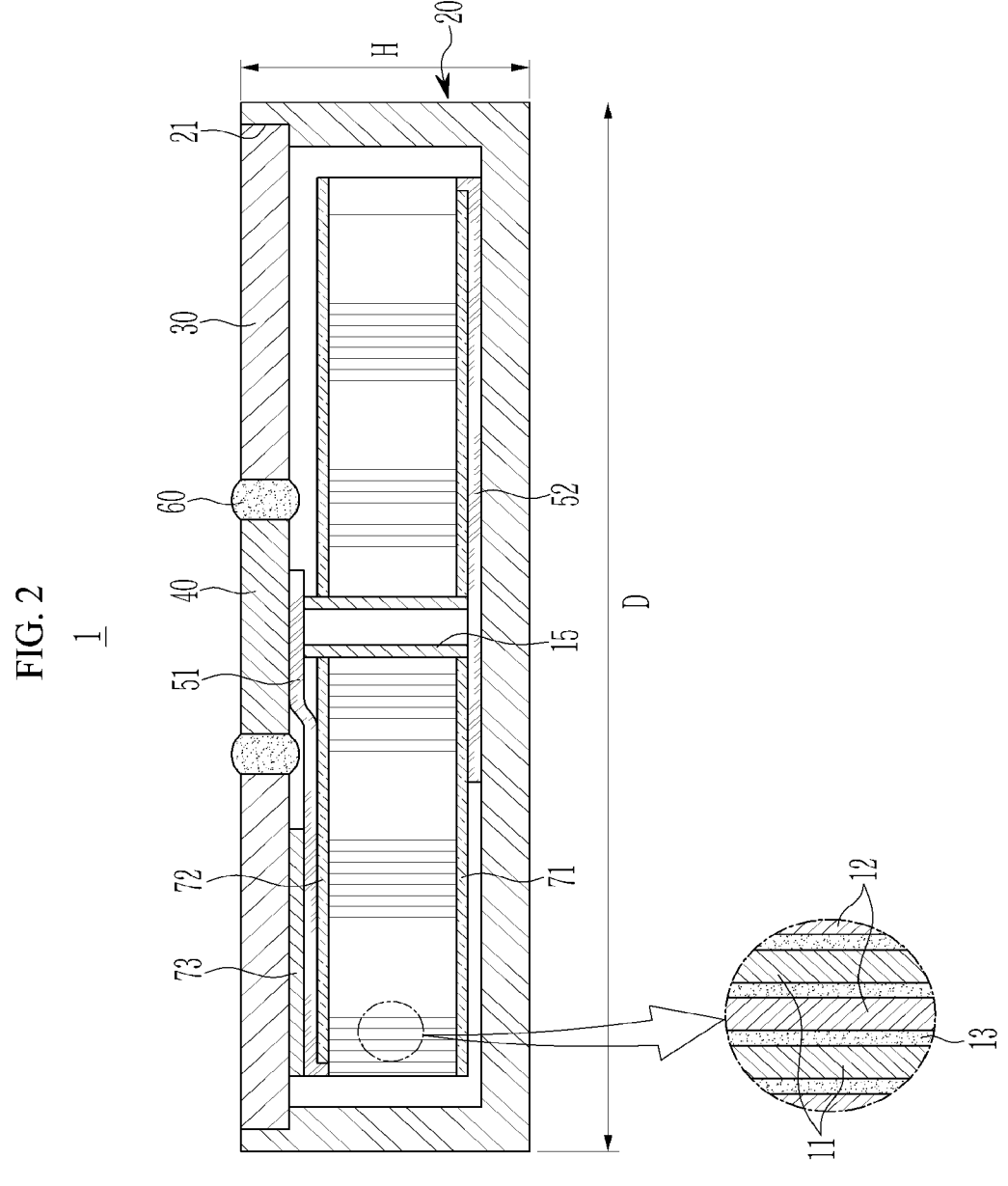
FIG. 2 is a cross-sectional view taken along a line II-II of FIG. 1.

FIG. 1 is an exploded perspective view of a rechargeable battery according to a first embodiment of the present invention, and FIG. 2 is a cross-sectional view taken along a line II-II of FIG. 1. Referring to FIG. 1 and FIG. 2, the rechargeable battery 1 according to the first embodiment includes an electrode assembly 10, a case 20, a cap plate 30, an electrode terminal 40, a first lead tab 51, and a second lead tab 52.

The electrode assembly 10 includes a first electrode (11, for example, a negative electrode) and a second electrode (12, for example, a positive electrode) provided on respective surfaces of a separator 13 that is an electrical insulating material, and is formed by winding the first electrode 11, the separator 13 and the second electrode 12. Accordingly, the electrode assembly 10 may have a jelly-roll shape, and is configured to charge and discharge a current.

At this time, the wound axis of the electrode assembly 10 may be arranged parallel to the height direction of the case 20, and the lower surface (one end of both ends) and the upper surface (the other end of both ends) of the electrode assembly 10 are flat and parallel to each other.

The electrode assembly 10 has a center pin 15 in a place of the wound shaft. When welding the first and second lead tabs 51 and 52 to the electrode terminal 40 and the case 20, one end of the center pin 15 adheres the first lead tab 51 and the electrode terminal 40 and the other adheres the second lead tab 52 and the case 20, thereby improving the welding performance. The center pin 15 is formed as a cylinder to enable the flow of a gas and an electrolyte solution therein. Also, the center pin may be formed as a circular cylinder (not shown).

Hereinafter, a case where the first electrode 11 and the second electrode 12 are a negative electrode and a positive electrode is described as an example, but the present invention is not limited thereto, and the first electrode 11 and the second electrode 12 may be a positive electrode and a negative electrode, respectively.

The negative electrode (11, a first electrode) is formed of a long band shape, and includes a negative electrode coating region as a region in which an active material layer is coated on a current collector of a metal foil (e.g., a Cu foil) and a negative uncoated region of a region in which the active material is not coated. The negative uncoated region may be positioned at one end of one side in the length direction of the negative electrode.

The positive electrode (12, a second electrode) is formed of a long band shape, and includes a positive electrode coating region as a region in which a positive electrode active material layer is coated to a current collector of a metal foil (e.g., an Al foil) and a positive electrode uncoated region as a region where the active material is not coated. The positive electrode uncoated region may be disposed at the end of one side of the positive electrode in the length direction.

The case 20 allows the electrode assembly 10 to be inserted through an opening 21 formed on one side and accommodated. The case 20 sets a space inside which the electrode assembly 10 and the electrolyte solution are accommodated. For example, the case 20 may have a cylindrical shape with a low height, and may have a circular opening 21 at an upper end to insert the electrode assembly 10 of the cylindrical shape.

The cap plate 30 closes and seals the opening 21 of the case 20 and may be coupled and welded to the opening 21. The cap plate 30 is formed corresponding to the opening 21 and has a terminal hole 31.

The electrode terminal 40 is installed with the insulating sealing material 60 in the terminal hole 31 through the sealing process. That is, the electrode terminal 40 and the cap plate 30 are electrically insulated and have different polarities from each other. Since the insulating sealing material 60 does not exist in the disassembled state but in the assembled state, it is omitted FIG. 1 and is shown in FIG. 2.

In the electrode assembly 10, the first lead tab (51, a negative electrode tab) is fixedly installed on the negative electrode 11, and the second lead tab (52, a positive electrode tab) is fixedly installed on the positive electrode 12. Therefore, in the first embodiment, the electrode terminal 40 has a negative electrode property, and the cap plate 30 has a positive electrode property. Although not shown separately, the electrode terminal 40 may have a positive electrode property and the cap plate 30 may have a negative electrode property.

The first lead tab 51 and the second lead tab 52 are installed in the negative uncoated region and the positive electrode uncoated region, respectively, and after extending parallel to the wound axis, their ends may be bent toward the wound axis. For example, the bent ends of the first lead tab 51 and the second lead tab 52 may be disposed to the upper portion (the cap plate 30 side) and the lower portion (the case 20 side) of the electrode assembly 10, respectively.

The first lead tab 51 is made of an electrically conductivity material such as copper or nickel, and is directly electrically connected to the electrode terminal 40. For example, the bent end of the first lead tab 51 may be connected to the electrode terminal 40 by laser welding.

The second lead tab 52 is made of an electrically conductivity material such as nickel and aluminum, and is electrically connected to the case 20. For example, the bent end of the second lead tab 52 may be connected to the bottom surface of the case 20 by laser welding.

The insulating sealing material 60 interposed between the electrode terminal 40 and the terminal hole 31 and around the electrode terminal 40 may be formed of, for example, a glass seal. The insulating sealing material 60 electrically insulates the cap plate 30 and the electrode terminal 40 while sealing between the inner surface of the terminal hole 31 and the outer surface of the electrode terminal 40.

If the insulating sealing material 60 is a glass seal, the cap plate 30 and the electrode terminal 40 may be made of stainless steel. In addition, the insulating sealing material 60 must be able to overcome a thermal impact even at a high temperature of about 1000° C.

For example, the insulating sealing material 60 should have crack resistance when undergoing a thermal impact and thermal expansion due the charging and discharging and during the welding of the first lead tab 51 to the electrode terminal 40. The glass seal may overcome this thermal impact. The area of the electrode terminal 40 may be set so that the insulating sealing material 60 may be applied within a range that can overcome the required thermal impact.

As an example, since the electrode terminal 40 is formed of a plate having the same thickness t as the thickness t of the cap plate 30, air-tightness performance and bonding performance by the insulating sealing material 60 may be improved. And in the cap plate 30 and the electrode terminal 40, the outer surfaces are formed to be coplanar, and the inner surfaces are formed to be coplanar.

The insulating sealing material 60 is formed by injecting molten glass between the circumferential outer surface of the electrode terminal 40 and the inner surface of the terminal hole 31 due to a process characteristic, so it may be more protruded than the outer surfaces of the electrode terminal 40 and the cap plate 30 and may be more protruded than the inner surfaces.

In the first embodiment, the first lead tab 51 is connected to the electrode terminal 40 formed as a plate, and the second lead tab 52 is connected to the case 20. First lead tab 51 is welded to the electrode terminal 40, but the electrode terminal 40 is not protruded outward and forms the same outer surface as the cap plate 30.

Since the first lead tab 51 is laser welded directly to the electrode terminal 40, the process of connecting the first lead tab 51 to the electrode terminal 40 is facilitated.

And the second lead tab 51 is laser welded directly to the bottom of case 20.

At this time, the center pin 15 supports the first and second lead tabs 51 and 52 so that the first lead tab 51 and the electrode terminal 40 are in close contact, and the second lead tab 52 and the case 20 are in close contact, thereby improving the welding performance of each.

Again referring to FIG. 1 and FIG. 2, the rechargeable battery 1 of the first embodiment further includes a first insulating member 71 interposed between the second lead tab 52 and the electrode assembly 10 at the bottom side of the case 20. The first insulating member 71 electrically insulates between the electrode assembly 10 and the bent second lead tab 52.

The rechargeable battery 1 of the first embodiment further includes, at the cap plate 30 side, a second insulating member 72 interposed between the first lead tab 51 and the electrode assembly 10, and a third insulating member 73 interposed between the first lead tab 51 and the cap plate 30.

The second insulating member 72 electrically insulates between the electrode assembly 10 and the bent first lead tab 51. The third insulating member 73 electrically further insulates between the bent first lead tab 51 and the cap plate 30.

In the present embodiment, the first and second insulating members 71 and 72 have a through hole through which the center pin 15 passes so that the center pin 15 more firmly supports the first and second lead tabs 51 and 52. Although not shown, the first and second insulating members may not have a through hole, and the center pin may support the first and second insulating members to support the first and second lead tabs.

Although not shown, the electrode assembly 10 is covered with an insulating tape along the diameter direction of the external circumferential surface. The insulating tape electrically insulates between the external circumferential surface of the electrode assembly 10 and the inner surface of case 20 while protecting the outside of the electrode assembly 10.

When the rechargeable battery 1 of the first embodiment is applied to a coin-type battery or a button-type battery, the height H is set as the minimum distance between the outer planes of the case 20 and the cap plate 30, and the diameter D is set as the maximum distance of the exterior circumference of the case 20. Also, the ratio of the height H for the diameter D is 1 or less (H/D≤1).

As such, in the case of the coin-type or button-type battery with a low height compared to the diameter, since the connection structure between the electrode terminal 40 and the first lead tab 51 is thinly formed, in the case of having the same height H and diameter D, as compared with the case where the connection structure is thick, while the size of the electrode assembly 10 increases, the capacity of the rechargeable battery 1 may be increased as a whole.

Hereinafter, a second embodiment of the present invention is described. Compared with the first embodiment, the same components are omitted and different components are described.

Figure 3:
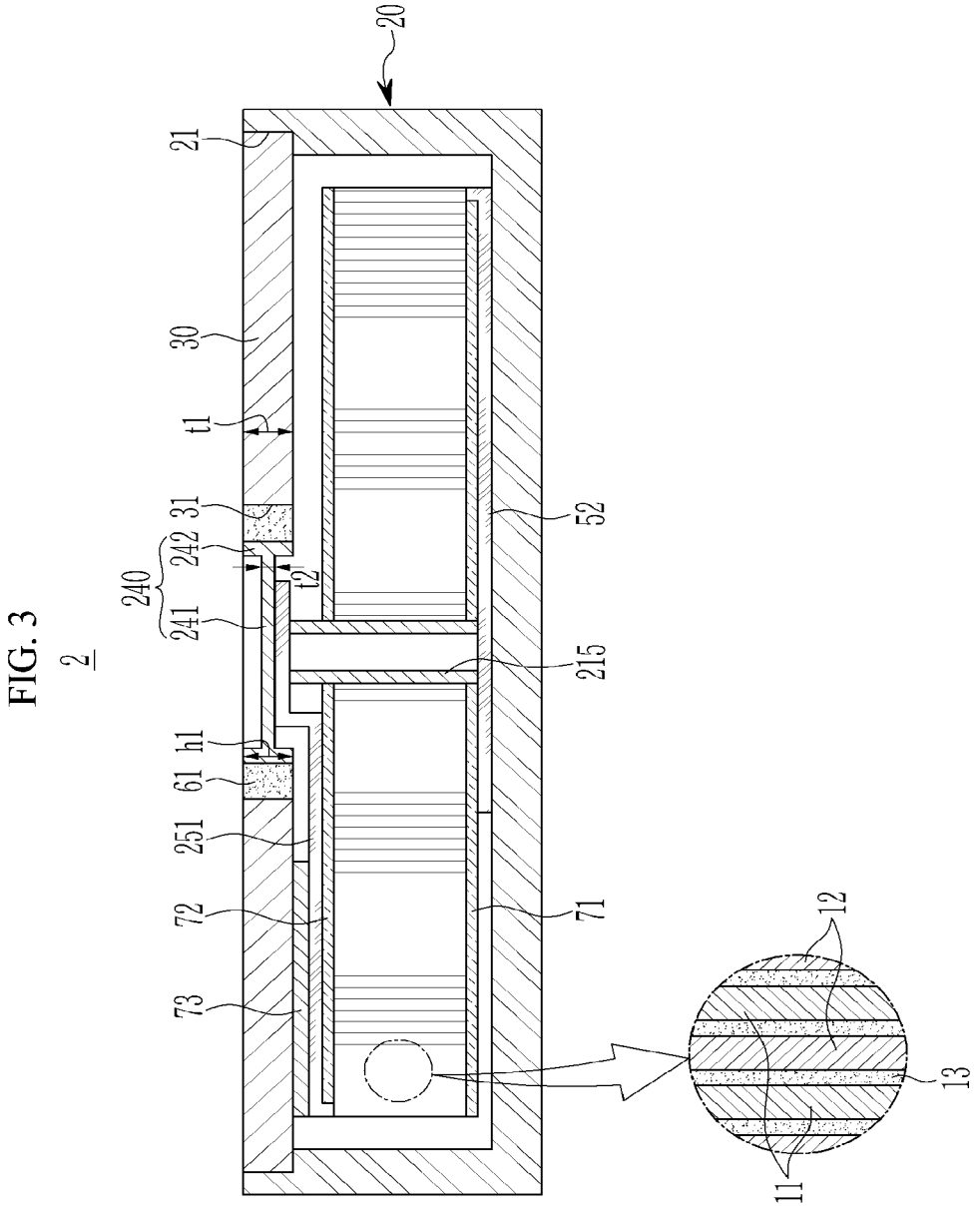
FIG. 3 is a cross-sectional view of a rechargeable battery according to a second embodiment of the present invention.

FIG. 3 is a cross-sectional view showing a rechargeable battery according to a second embodiment of the present invention. Referring to FIG. 3, in the rechargeable battery 2 of the second embodiment, the electrode terminal 240 includes a plate part 241 and a both-sided flange part 242.

The plate part 241 is formed with a second thickness (t2<t1) that is thinner than the first thickness t1 of the cap plate 30. The both-sided flange part 242 is protruded from the exterior circumference of the plate part 241 to both sides in the thickness direction, has a first height h1, and is connected to the inner surface of the terminal hole 31 with an insulating sealing material 61.

Since the both-sided flange part 242 is formed with the same first height (h1=t1) as the first thickness t1 of the cap plate 30, the air-tightness performance and the joint performance by the insulating sealing material 61 may be improved. And in the both-sided flange part 242 of the electrode terminal 240 and the cap plate 30, the outer surfaces are formed in the same plane, and the inner surfaces are formed in the same plane.

The plate part 241 is positioned lower than the outer surface of the cap plate 30. The insulating sealing material 61 may be protruded more than the outer surfaces of the electrode terminal 40 and the cap plate 30, and may be protruded more than the inner surfaces due to the process characteristics.

In the second embodiment, the first lead tab 251 is connected to the plate part 241 by welding, and the second lead tab 52 is connected to the case 20 by welding. Since the first lead tab 251 is laser welded to the plate part 241, the welding is easy. Therefore, since the plate part 241 is formed with a second thickness t2 that is thinner than the first thickness t1, the laser welding with the first lead tab 251 becomes easier.

In this case, the center pin 215 supports the first and second lead tabs 251 and 52 so that the first lead tab 251 and the plate part 241 of the electrode terminal 240 are closely in contact with each other, and the second lead tab 52 and the case 20 are closely in contact with each other, thereby improving the welding performance of each.

Figure 4:
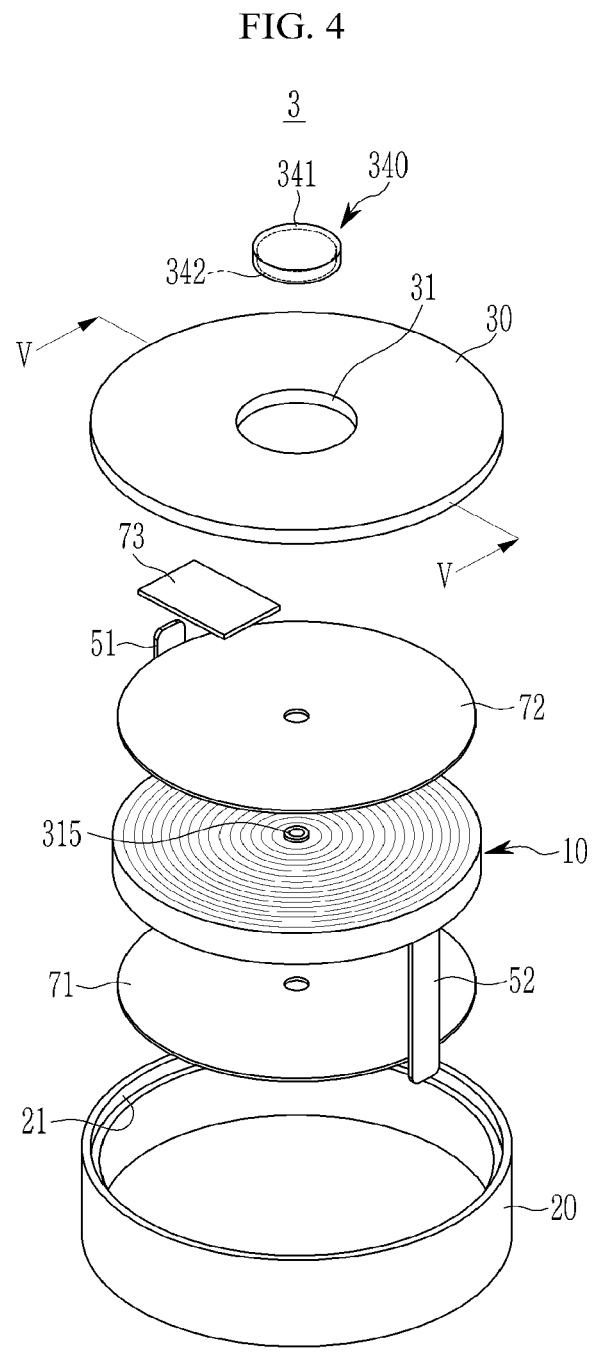
Figure 5:
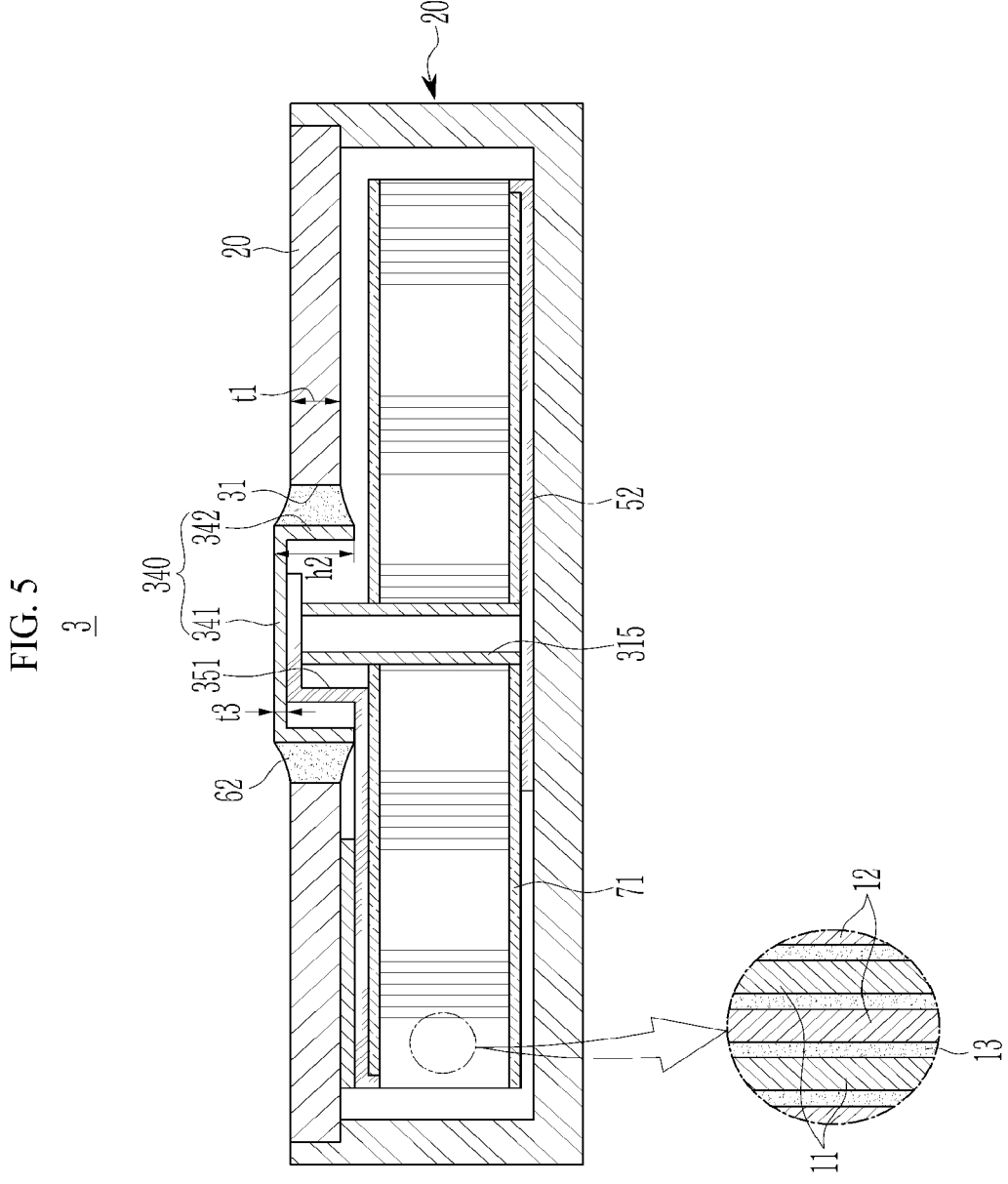
FIG. 5 is a cross-sectional view taken along a line V-V of FIG. 4.

FIG. 4 is an exploded perspective view of a rechargeable battery according to a third embodiment of the present invention, and FIG. 5 is a cross-sectional view taken along a line V-V of FIG. 4. Referring to FIG. 4 and FIG. 5, in the rechargeable battery 3 of the third embodiment, the electrode terminal 340 includes a plate part 341 and a one-sided flange part 342.

The plate part 341 is formed with a third thickness t3 that is thinner than the first thickness t1 of the cap plate 30. The one-sided flange part 342 is protruded from the exterior circumference of the plate part 341 to one side in the thickness direction, has a second height h2, and is connected to the inner surface of the terminal hole 31 with the insulating sealing material 62.

The one-sided flange part 342 is formed with a second height (h2>t1) that is greater than the first thickness t1 of the cap plate 30. The second height h2 increases the sealing area with the terminal hole 31 by the insulating sealing material 62, thereby improving the air-tightness performance and the bonding performance.

And the one-sided flange part 342 is disposed at the center of the thickness direction in the terminal hole 31, and the insulating sealing material 62 is formed symmetrically on the inside and outside along the thickness direction. The outer side means the outer side of the rechargeable battery 3 based on the cap plate 30, and the inner side means the inner side of the rechargeable battery 3 based on the cap plate 30.

That is, the plate part 341 is more protruded out of the outer surface of cap plate 30, and the one-sided flange part 342 is more protruded into the inner surface of the cap plate 30. Therefore, the insulating sealing material 62 may seal the one-sided flange part 342 and the terminal hole 31 while maintaining the balance of the bonding performance on the outside and inside in the thickness direction.

Also, since the second height h2 of the one-sided flange part 342 is larger than the first thickness t1 of the cap plate 30, the insulating sealing material 62 is formed thickly on the one-sided flange part 342 and thinly on the cap plate 30 side, and forms an inclined plane therebetween.

In the third embodiment, the first lead tab 351 is connected to the plate part 341 by welding, and the second lead tab 52 is connected to the case 20 by welding. Since the first lead tab 351 is laser welded to the plate part 341, the welding is easy. Therefore, as the plate part 341 is formed with the third thickness t3 that is thinner than first thickness t1, the laser welding with the first lead tab 251 becomes easier.

In addition, since the plate part 341 is positioned more outward in the thickness direction than the inner surface of the cap plate 30, the first lead tab 351 is positioned inside the one-sided flange part 342. That is, by the one-sided flange part 342, the welding space between the plate part 341 and the first lead tab 351 may be secured larger in the thickness direction.

In this case, the center pin 315 supports the first and second lead tabs 351 and 52 to firmly closely contact the first lead tab 351 and the plate part 341 of the electrode terminal 340, and the second lead tab 52 and the case 20, thereby Improving the welding performance.

Figure 6:
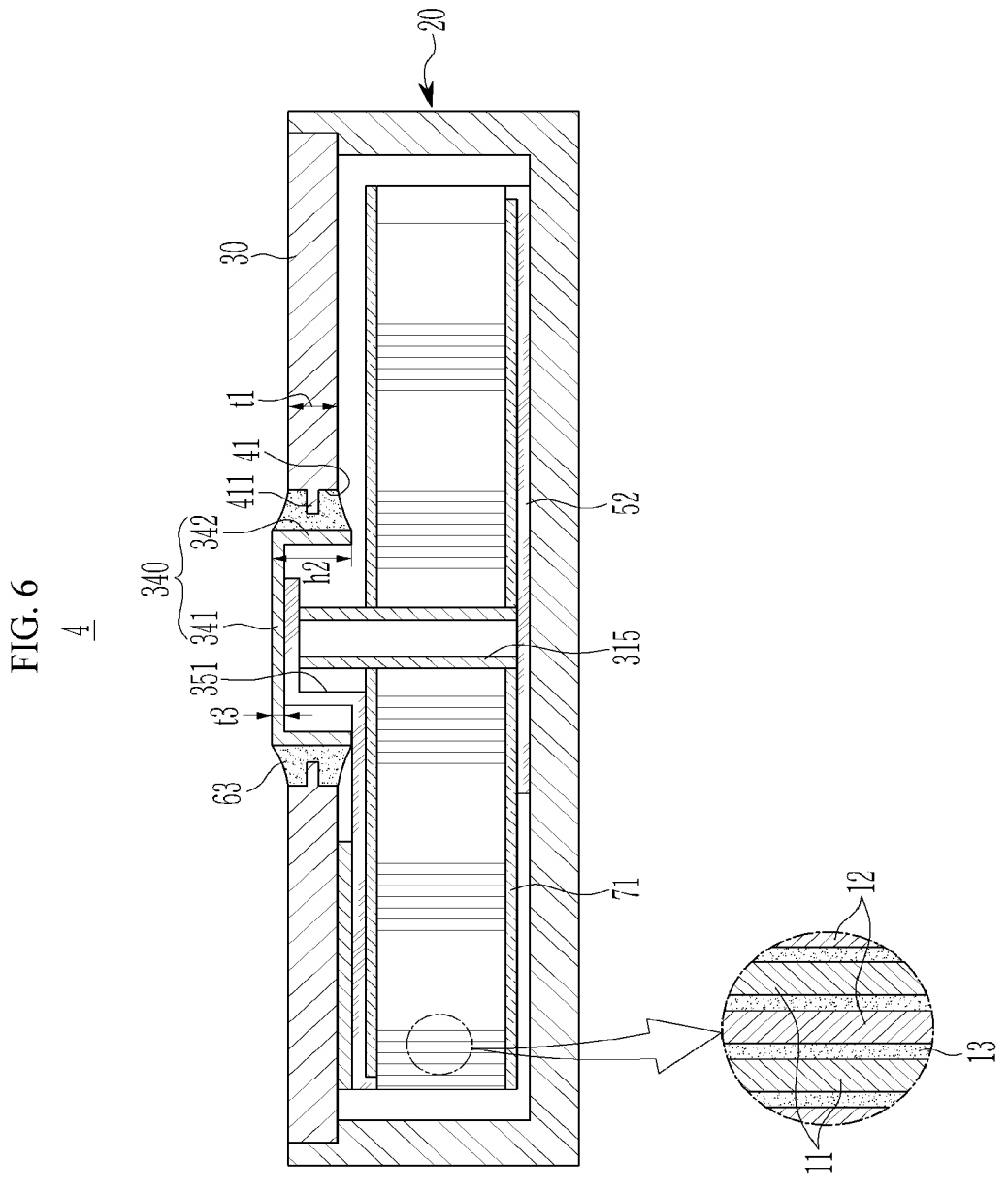
FIG. 6 is a cross-sectional view of a rechargeable battery according to a fourth embodiment of the present invention.

FIG. 6 is a cross-sectional view of a rechargeable battery according to a fourth embodiment of the present invention. Referring to FIG. 6, in the rechargeable battery 4 of the fourth embodiment, the one-sided flange part 342 of the electrode terminal 340 is disposed at the center of the thickness direction in the terminal hole 41.

The terminal hole 41 further has a protrusion 411 protruding from the thickness direction center toward the diameter direction center. The insulating sealing material 63 forms a symmetrical structure on the inside and outside along the thickness direction while filling the protrusion 411.

At this time, the insulating sealing material 63 increases the bonding area between the one-sided flange part 342 and the terminal hole 41 due to the protrusion 411, so that the sealing performance and bonding performance may be further improved.

Figure 7:
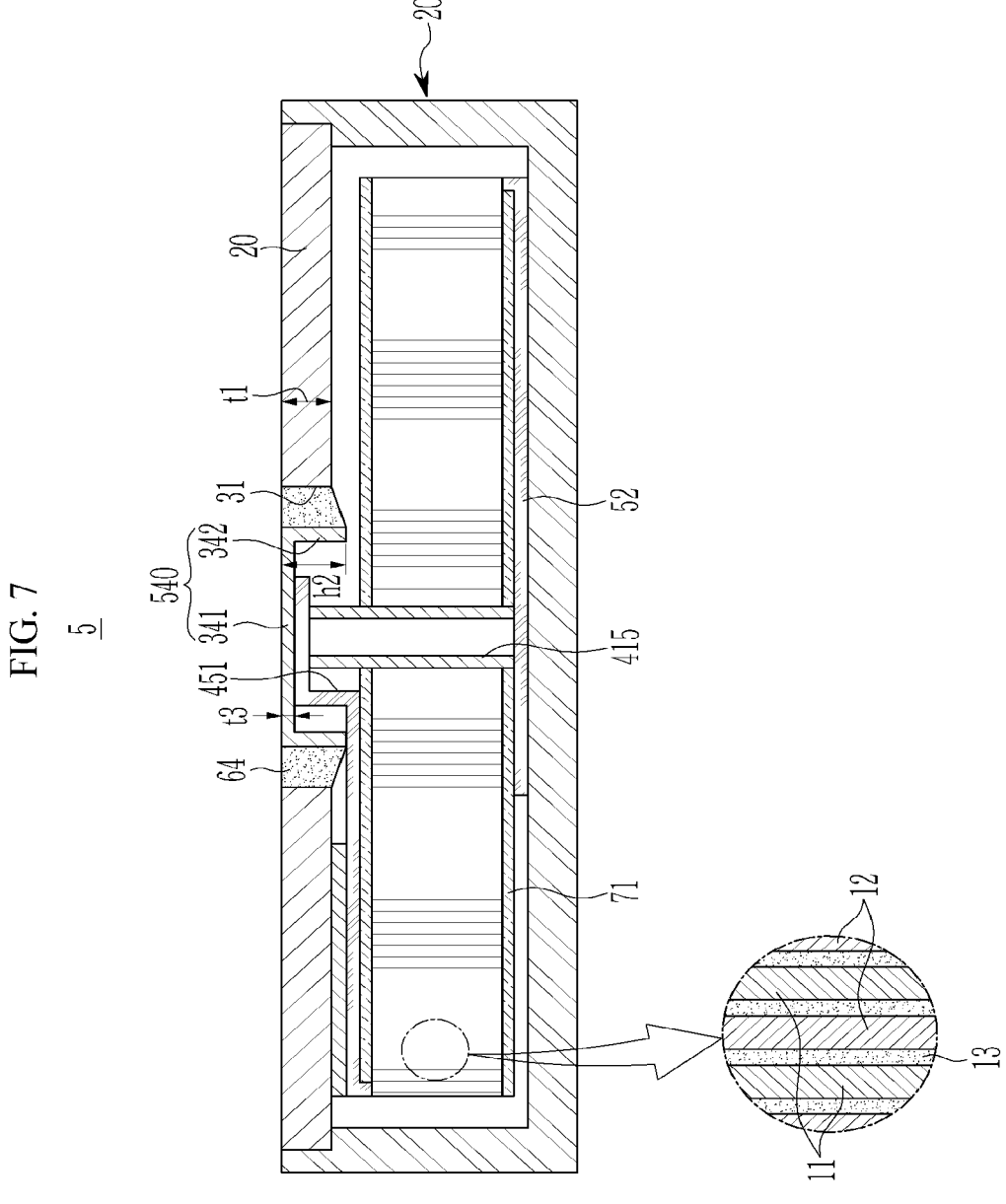
FIG. 7 is a cross-sectional view of a rechargeable battery according to a fifth embodiment of the present invention.

FIG. 7 is a cross-sectional view of a rechargeable battery according to a fifth embodiment of the present invention. Referring to FIG. 7, in the rechargeable battery 5 of the fifth embodiment, a plate part 341 of the electrode terminal 540 is disposed to form the horizontal surface with the outer surface of the cap plate 30 at the terminal hole 31. The electrode terminal 540, that is, the one-sided flange part 342, is biased and disposed from the terminal hole 31 to the inner surface side.

The insulating sealing material 64 forms the horizontal plane with the outer surface of the cap plate 30 and the outer surface of plate part 341, and forms a structure that is biased inward along the thickness direction by the one-sided flange part 342.

At this time, the insulating sealing material 64 secures the bonding area with the one-sided flange part 342 and the terminal hole 31 to secure the sealing performance and the bonding performance while preventing the electrode terminal 540 from being protruded out of the outer surface of the cap plate 30.

In this case, the center pin 415 supports the first and second lead tabs 451 and 52 to firmly adhere the first lead tab 451 and the plate part 341 of the electrode terminal 340, and the second lead tab 52 and the case 20, thereby improving the welding performance of each.

While this invention has been described in connection with what is presently considered to be practical embodiments, it is to be understood that the invention is not limited to the disclosed embodiments. On the contrary, it is intended to cover various modifications and equivalent arrangements included within the scope of the appended claims.

the second lead tab is connected to the case.

4. The rechargeable battery of claim 1, further comprising a first insulating member interposed between the second lead tab and the electrode assembly at the bottom side of the case.

5. The rechargeable battery of claim 4, further comprising a second insulating member interposed between the first lead tab and the electrode assembly at a side of the cap plate.

6. The rechargeable battery of claim 5, further comprising a third insulating member interposed between the first lead tab and the cap plate.

7. The rechargeable battery of claim 1, wherein a height H is set as a minimum distance between the outer planes of the case and the cap plate, a diameter D is set as a maximum distance of the case exterior circumference, and a ratio of the height to the diameter is 1 or less (H/D≤1).

8. The rechargeable battery of claim 1, wherein the cap plate and the electrode terminal are formed of stainless steel.

9. The rechargeable battery of claim 1, wherein

<Description of symbols>

| | |
|---|---|
| 1, 2, 3, 4, 5: rechargeable battery | 10: electrode assembly |
| 13: separator | 11: first electrode (negative electrode) |
| 12: second electrode (positive electrode) | 15, 215, 315, 415: center pin |
| 20: case | 21: opening |
| 30: cap plate | 31, 41: terminal hole |
| 40, 240, 340, 540: electrode terminal | 51, 251, 351, 451: first lead tab |
| 52: second lead tab | 60, 61, 62, 63, 64: insulating sealing material |
| 71: first insulating member | 72: second insulating member |
| 73: third insulating member | 24, 341: plate part |
| 242: both-sided flange part | 342: one-sided flange part |
| 411: protrusion | D: diameter |
| H: height | h1: first height |
| t: thickness | t1: first thickness |
| t2: second thickness | t3: third thickness |

What is claimed is:

1. A rechargeable battery comprising:
an electrode assembly formed by disposing and winding a separator between a first electrode and a second electrode;
a case facing one of wound ends of the electrode assembly and accommodating the electrode assembly;
a cap plate facing a second one of the wound ends, and closing and sealing an opening of the case;
an electrode terminal installed in a terminal hole formed in the cap plate by interposing an insulating sealing material, wherein the electrode terminal has a first part and a second part protruded from an exterior circumference of the first part on at least one side in a thickness direction, wherein the second part contacts the insulating sealing material, wherein the second part of the electrode terminal has a first height that is equal or greater than a first thickness (t1) of the cap plate, and the first part of the electrode terminal is formed as a plate and has a second thickness that is thinner than the first thickness of the cap plate;
a first lead tab extending from the first electrode; and
a second lead tab extending from the second electrode.

2. The rechargeable battery of claim 1, wherein the insulating sealing material is formed by a glass seal.

3. The rechargeable battery of claim 1, wherein the first lead tab is connected to the electrode terminal, and the first electrode includes a first coated portion and a first uncoated portion, and
the second electrode includes a second coated portion and a second uncoated portion, and
wherein the first lead tab extends from the first uncoated portion, and
the second lead tab extends from the second uncoated portion.

10. The rechargeable battery of claim 1, wherein the second part is a both-sided flange part protruded from the exterior circumference of the first part of the electrode terminal formed as the plate to both sides in the thickness direction and connected to the inner surface of the terminal hole with the insulating sealing material with the first height h1.

11. The rechargeable battery of claim 10, wherein the both-sided flange part is formed with a same first height (h1=t1) as the first thickness (t1) of the cap plate.

12. The rechargeable battery of claim 10, wherein the first lead tab is connected to the plate part by welding, and
the second lead tab is connected to the case by welding.

13. The rechargeable battery of claim 1, wherein the second part is a one-sided flange part protruded from the exterior circumference of the plate part to one side in the thickness direction and connected to the inner surface of the terminal hole with the insulating sealing material with a second height h2.

14. The rechargeable battery of claim 13, wherein
the one-sided flange part is formed with the second height
  (h2>t1) that is larger than the first thickness (t1) of the
  cap plate.

15. The rechargeable battery of claim 14, wherein
the one-sided flange part is disposed to be centered in the
  thickness direction in the terminal hole, and
the insulating sealing material is formed in a symmetrical
  structure on the inside and outside along the thickness
  direction.

16. The rechargeable battery of claim 14, wherein
the one-sided flange part is disposed to be centered in the
  thickness direction in the terminal hole,
the terminal hole has a protrusion protruding from the
  center of the thickness direction toward the center of a
  diameter direction, and
the insulating sealing material forms a symmetrical struc-
  ture on the inside and outside along the thickness
  direction while filling the protrusion.

17. The rechargeable battery of claim 14 wherein
the one-sided flange part is disposed to be biased to the
  inner surface side rather than the outer surface of the
  cap plate at the terminal hole,
the plate part is disposed by forming a horizontal plane
  with the outer surface of the cap plate in the terminal
  hole, and
the insulating sealing material forms a horizontal plane
  with the outer surface of the cap plate and the outer
  surface of the plate part, and forms a structure that is
  biased inward along the thickness direction.

* * * * *